Jan. 1, 1957   M. L. BLACKSTOCK   2,775,926
COTTON THINNING MACHINE
Filed Aug. 6, 1954   3 Sheets-Sheet 3

INVENTOR.
Marvin L. Blackstock
BY
McMorrow, Berman + Davidson
ATTORNEYS

United States Patent Office 2,775,926
Patented Jan. 1, 1957

2,775,926

COTTON THINNING MACHINE

Marvin L. Blackstock, Resaca, Ga.

Application August 6, 1954, Serial No. 448,299

1 Claim. (Cl. 97—15)

This invention relates to agricultural implements, and more particularly to an improved cotton thinning attachment adapted to be employed with a conventional farm tractor.

A main object of the invention is to provide a novel and improved cotton thinning machine which is simple in construction, which is easy to mount on a tractor, and which provides an efficient thinning action whose intensity may be regulated by driving the tractor employed with the machine in different gear positions.

A further object of the invention is to provide an improved cotton thinning attachment for a farm tractor, said attachment being inexpensive to fabricate, being sturdy in construction, and being provided with means to engage the ground between two adjacent rows of cotton to support the rotating toothed cotton thinning elements so that the teeth of said rotating elements will not penetrate too deeply into the ground, thereby performing a more uniform and controlled thinning action than has been heretofore available with the thinning machines previously employed for this purpose.

Further objects and advantages of the invention will become apparent from the following description and claim, and from the accompanying drawings, wherein:

Figure 5 is an enlarged cross sectional detail view taken on the line 5—5 of Figure 1.

Figure 6 is an enlarged cross sectional detail view taken on the line 6—6 of Figure 3.

Figure 7 is a perspective view of the skid attachment employed with the cotton thinning machine of Figures 1 to 6.

Figure 1:
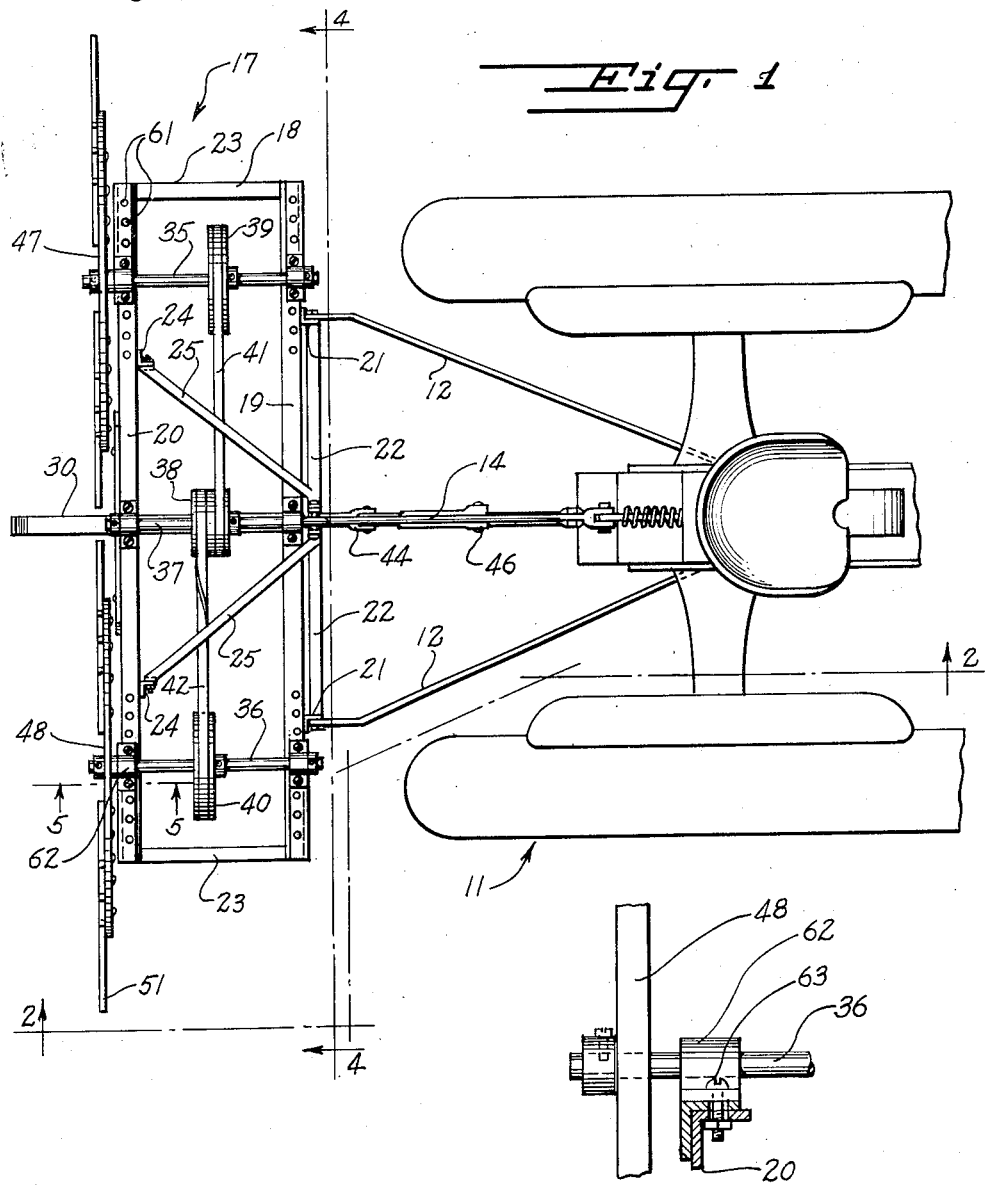
Figure 1 is a top plan view of an improved cotton thinning machine according to the present invention, shown attached to a conventional farm tractor.

Referring to the drawings, 11 generally designates a conventional farm tractor of the type provided with the rearwardly converging lower hitch arms 12, 12 and the upwardly and rearwardly extending upper attachment arm 13 to which may be connected the top link bar 14 for connecting a piece of agricultural equipment to the rear end of the tractor. The arms 12, 12 are connected by link bars 15 to the lift arms 16 of the tractor, whereby the piece of equipment attached to the tractor may be elevated at times by the tractor mechanism.

Figure 2:
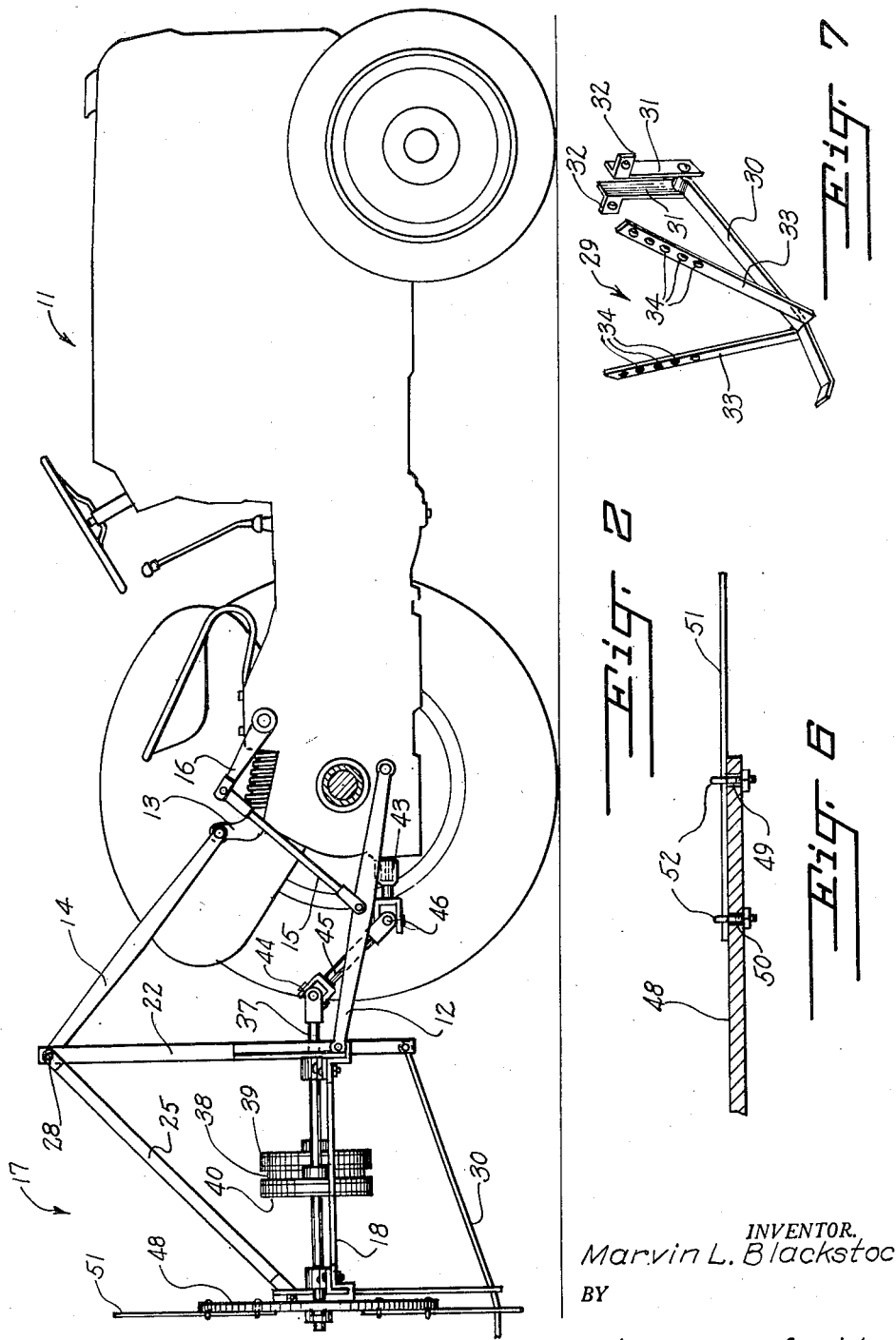
Figure 2 is a longitudinal vertical cross sectional view taken on the line 2—2 of Fig. 1.

Designated generally at 17 is a cotton thinning attachment in accordance with the present invention, said attachment comprising an elongated rectangular frame 18 adapted to be connected transversely to the rear of the tractor 11 in the manner illustrated, as for example, to the members 12 and 14. As shown in Figure 1, the frame 18 comprises parallel front and rear bars 19 and 20 which are connected at their ends by the relatively short end bars 23, 23. Secured to the rear bar 20 are the respective brackets 24, 24, and secured to the front bar 19 are the respective brackets 21, 21. Connected to the brackets 24 are the upwardly and forwardly convergent tie bars 25, 25, and connected to the brackets 21, 21 are the upwardly and inwardly convergent tie bars 22, 22. The top ends of the bars 22 and 25 are pivotally connected to the upper end of the link bar 14, as shown in Figure 2, the pivotal connection comprising a transverse pivot pin 28 extending through the ends of the bars 22, 25 and 14. The rear ends of the bars 12 are connected to the brackets 21, 21, as shown, whereby the frame 18 is connected to the rear of the tractor and may be elevated by the tractor mechanism whenever desired.

Designated generally at 29 is a skid assembly which may be connected to the frame 18 for supporting said frame above a pair of adjacent rows of cotton plants to be thinned. The attachment 29 comprises the skid bar 30 which is connected to a pair of parallel vertical bracket bars 31, 31 having the apertured top lugs 32, 32 which are secured to the intermediate portion of the main frame bar 19 so that the bars 31, 31 depend vertically from the main frame bar, as is clearly shown in Figures 3 and 4. Rigidly secured to the rear portion of the skid bar 30 are the upwardly divergent bracket bars 33, 33 having the longitudinally spaced apertures 34, the bracket bars 33, 33 being secured to the rear main bar 20 of the frame 18 at selected apertures 34 so that the frame 18 is supported at a desired height above the plants to be thinned. The skid bar 30 is adapted to engage the soil between the adjacent rows of cotton plants to be thinned and to support the machine at the proper height.

Journaled on the opposite sides of the frame 18 are the respective shafts 35 and 36, said shafts being located symmetrically with respect to a central shaft 37 journaled on the mid portion of the frame. As shown, the shaft 37 extends longitudinally with respect to the tractor 11 and the shafts 36 and 35 are parallel to and spaced equal distances on opposite sides of the shaft 37. Shaft 37 has mounted thereon the double pulley 38, and the respective shafts 35 and 36 have mounted thereon the respective pulleys 39 and 40. The shaft 38 is coupled to the shafts 35 and 36 by respective belts 41 and 42, as shown, the belt 31 connecting one section of the double pulley 38 to the pulley 39 and the belt 42 connecting the other section of the pulley 38 to the pulley 40, the belt 42 being crossed so that the shafts 35 and 36 are driven in opposite directions responsive to the rotation of the shaft 37 in a given direction.

The shaft 37 is connected to the power takeoff shaft of the tractor, shown at 43, through a first universal joint 44, a shaft member 45, and a second universal joint 46, as shown in Figure 2.

Mounted on the rear ends of the respective shafts 35 and 36 are the respective disc members 47 and 48, said disc members being similar in construction. Each of the disc members is formed with the spaced radially aligned pairs of apertures 49 and 50, and secured in spaced sets of apertures 49 and 50 are the outwardly extending radial tines 51, said tines being fastened to the disc members by eye bolts 52 extending through the apertures 49 and 50, as shown in Figure 6. Thus, in operation of the machine, the disc member 47 rotates clockwise and the disc member 48 rotates counterclockwise, as viewed in Figure 3, the tractor being moved along the rows of cotton plants with the skid bar 30 supported on the soil between a pair of rows of plants, the toothed wheels 47 and 48 exerting the desired thinning action on the plants as the machine progresses along its course of travel.

Figure 3:
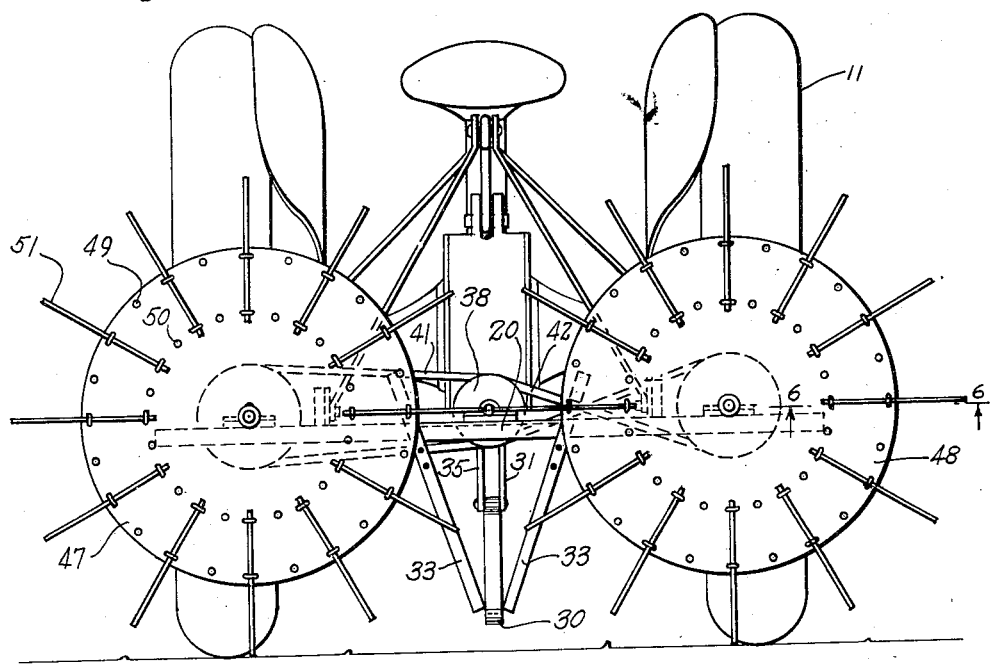
Figure 3 is a rear end view of the cotton thinning attachment and tractor of Figures 1 and 2.
Figure 4:
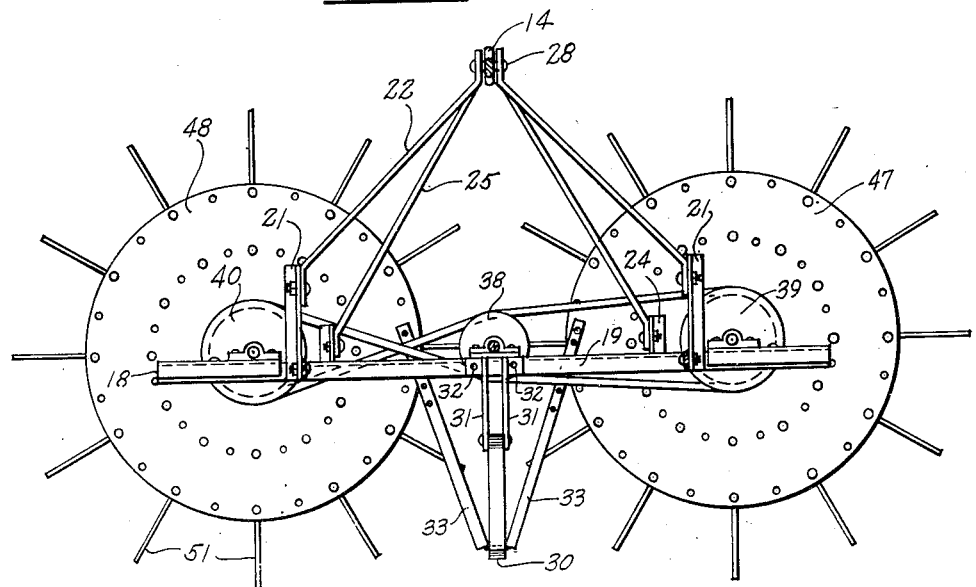
Figure 4 is a transverse vertical cross sectional view taken on the line 4—4 of Figure 1.

In the arrangement illustrated in the drawings, alternate apertures 49 and 50 are employed. If a more intense thinning action is desired, the tines 51 may be employed at all of the pairs of apertures 49 and 50, providing twice the number of tines 51 as illustrated in Figures 3 and 4. Conversely, to provide a less intense thinning action, fewer tines 51 may be employed than illustrated in Figures 3 and 4.

As will be apparent from the above explanation, the disc members 47 and 48 are driven from the power takeoff shaft of the tractor, and the speed of rotation of said disc members may be varied by driving the tractor in different gears. When driving the tractor in first gear, for example, the tractor movement is slow, and the motor speed is high, whereby the disc members 47 and 48 revolve at a relatively high speed, giving a more intense thinning action. Conversely, when the tractor is in higher gear, the rotational speed of the disc members 47 and 48 is slower, and the thinning action is less intense.

Thus, the intensity of the thinning action is inversely proportional to the speed of the tractor, since the speed of rotation of the disc members 47 and 48 is in inverse proportion to the tractor speed.

As shown in Figures 1 and 5, the shafts 36 and 35 may be mounted at desired adjusted positions on the frame bars 19 and 20, said frame bars being provided with the spaced apertures 61, whereby the shaft bearing brackets 62 may be secured to the frame bars, as by bolts 63, at the desired positions on the frame bars, in accordance with the spacing between the rows of plants to be thinned.

While a specific embodiment of an improved cotton thinning attachment for a tractor has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a cotton thinning attachment for a tractor, a link bar having a front end adapted to be pivoted to the tractor and a rear end, a rectangular horizontal frame comprising a front bar, a rear bar, and end bars extending between and secured to the front and rear bars, vertical front tie bars having lower ends secured to said front bar and upper ends, vertical rear tie bars having lower ends secured to said rear bar and upper ends, first means pivoting together the upper ends of the rear tie bars, the upper ends of the front tie bars, and the rear end of the link bar, and cotton thinning mechanism mounted on said frame, and a skid assembly comprising a skid bar having a front end and a rear ground-engaging end, first bracket means fixed to and depending from front bar, means pivoting the front end of the skid bar to said bracket means at a point spaced below said front bar, second vertically adjustable bracket means fixed to and depending from said rear bar, said second bracket means being secured to said skid bar at a point adjacent to the rear end of the skid bar.

References Cited in the file of this patent

UNITED STATES PATENTS

| | | |
|---|---|---|
| 658,460 | Nubar | Sept. 25, 1900 |
| 2,043,076 | Smith | June 2, 1936 |
| 2,479,510 | Pollard | Aug. 16, 1949 |
| 2,516,794 | Neel | July 25, 1950 |
| 2,621,460 | Hoapala | Dec. 16, 1952 |
| 2,640,405 | Wheeler | June 2, 1953 |
| 2,645,989 | Prince | July 21, 1953 |
| 2,649,721 | Spedding | Aug. 25, 1953 |
| 2,654,199 | Ohlendorf | Oct. 6, 1953 |

FOREIGN PATENTS

| | | |
|---|---|---|
| 245,275 | Great Britain | Jan. 7, 1926 |